V. V. OVERTURF.
VENT FOR LIQUID CONTAINING TANKS, &c.
APPLICATION FILED MAY 19, 1910.
968,394.
Patented Aug. 23, 1910.
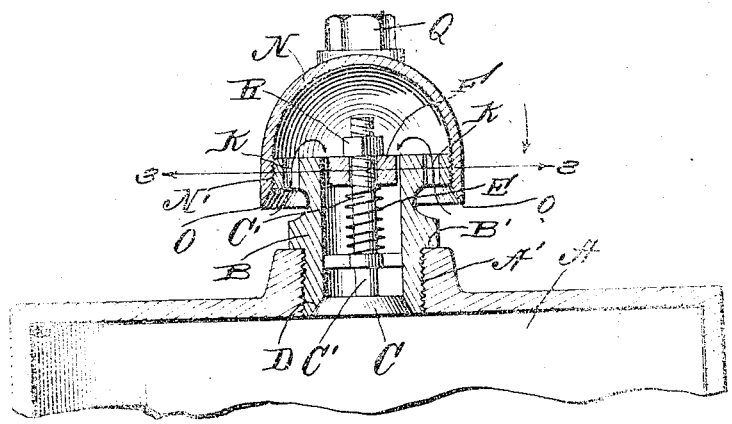
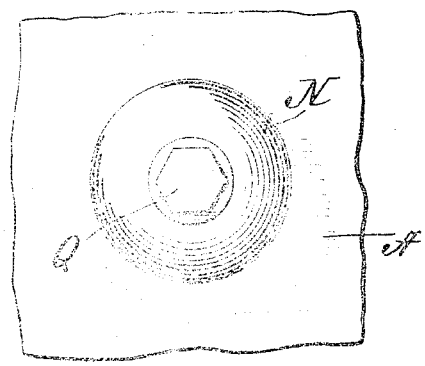
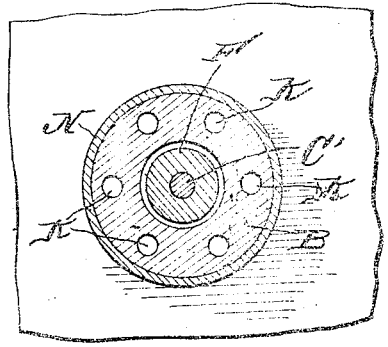
Witnesses
Inventor
V. V. Overturf,
By Franklin N. Hough
Attorney

UNITED STATES PATENT OFFICE.

VIRGIL V. OVERTURF, OF NEWARK, OHIO.

VENT FOR LIQUID-CONTAINING TANKS, &c.

968,394.

Specification of Letters Patent. Patented Aug. 23, 1910.

Application filed May 19, 1910. Serial No. 562,328.

*To all whom it may concern:*

Be it known that I, VIRGIL V. OVERTURF, citizen of the United States, residing at Newark, in the county of Licking and State of Ohio, have invented certain new and useful Improvements in Vents for Liquid-Containing Tanks, &c.; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in vents for liquid containing tanks, etc., and the object in view is to produce a simple and efficient device of this nature so constructed that, as the liquid is drawn from the tank, the space occupied by the liquid will be filled automatically with air, means being provided for protecting the device to prevent rain or any foreign matter from entering the vent.

The invention comprises various details of construction and combinations and arrangements of parts which will be hereinafter fully described and then specifically defined in the appended claim.

I illustrate my invention in the accompanying drawings, in which:—

Figure 1 is a sectional view of the device shown as applied to a tank. Fig. 2 is a top plan view of the vent, and Fig. 3 is a sectional view on line 3—3 of Fig. 1.

Reference now being had to the details of the drawings by letter, A designates a liquid containing tank having a threaded opening A′ formed therein for the reception of the valve plug B which has a threaded portion engaging the threads of said aperture and a shoulder B′ adapted to rest against the top of the tank. Mounted within said valve plug or casing is a check valve C having a stem C′ movable within an aperture in the integral disk portion F of the casing. Said valve has a beveled edge held against the beveled seat D by means of a coil spring E upon said stem and interposed between the valve and the disk portion F, which is provided with a series of perforations K whereby atmospheric air is allowed to enter, as indicated by arrows, and pass down through the interior passageway of the plug into the tank to replace liquid as it may be drawn from the tank. A nut R is mounted upon the threaded end of the stem C′ and serves to hold the valve in place and also affords means for regulating the tension of the spring E.

A convexed cap, designated by letter N, is provided with interior threads N′ adjacent to its marginal edge adapted to engage the threaded circumference of the disk portion F, as shown, and serves as a means to prevent rain or any foreign matter from entering the valve casing. The lower marginal edge of said cap is brought to a sharp circular outlined edge O, forming a drip and which extends beyond the circumference of the shank portion of the valve plug. In order to allow the cap to be screwed on and off, an angular outlined projection Q is provided for the reception of a wrench.

By the provision of a vent for tanks as shown and described, it will be noted that a simple and efficient means is afforded whereby rain and other foreign matter may be prevented from entering the tank as the liquid is drawn off therefrom and any liquid falling upon the convexed surface will drain off from the sharp drip edge of the cap.

What I claim to be new is:—

A vent for tanks comprising a valve casing having a threaded circumference adapted to engage the threaded opening in a tank, said casing having a constricted portion with its upper end of larger diameter than the body portion of the casing and provided with a series of perforations, a dome-shaped covering fitted about said projecting portion of the casing and its lower end beveled, and a check valve positioned within said casing, as shown and described.

In testimony whereof I hereunto affix my signature in the presence of two witnesses.

VIRGIL V. OVERTURF.

Witnesses:
S. L. JAMES,
JASPER JONES.